(12) United States Patent
Rohart

(10) Patent No.: US 10,167,636 B2
(45) Date of Patent: Jan. 1, 2019

(54) METHOD OF DESIGNING A CORRUGATED SHEET AND CORREGATED SHEET OBTAINED

(71) Applicant: ONDULINE, Levallois-Perret (FR)

(72) Inventor: Christophe Rohart, Bois Guillaume (FR)

(73) Assignee: ONDULINE, Levallois-Perret (FR)

( * ) Notice: Subject to any disclaimer, the term of this patent is extended or adjusted under 35 U.S.C. 154(b) by 51 days.

(21) Appl. No.: 15/318,849

(22) PCT Filed: Jun. 23, 2015

(86) PCT No.: PCT/FR2015/051667
§ 371 (c)(1),
(2) Date: Dec. 14, 2016

(87) PCT Pub. No.: WO2015/197968
PCT Pub. Date: Dec. 30, 2015

(65) Prior Publication Data
US 2017/0130458 A1 May 11, 2017

(30) Foreign Application Priority Data
Jun. 26, 2014 (FR) ...................... 14 55978

(51) Int. Cl.
*E04D 3/24* (2006.01)
*E04D 3/34* (2006.01)
(Continued)

(52) U.S. Cl.
CPC ............... *E04D 3/24* (2013.01); *D06M 15/17* (2013.01); *E04D 3/34* (2013.01); *B32B 3/28* (2013.01);
(Continued)

(58) Field of Classification Search
CPC .... E04D 3/24; E04D 3/32; B32B 3/28; B32B 11/00; B32B 11/02; B32B 11/10; Y10T 428/24694; Y10T 428/31815
See application file for complete search history.

(56) References Cited

U.S. PATENT DOCUMENTS

2013/0186033 A1\* 7/2013 Thomas ................. D06N 5/003
52/741.3

FOREIGN PATENT DOCUMENTS

EP 0395290 \* 10/1990
WO 94/18319 A1 8/1994

OTHER PUBLICATIONS

Machine translation of applicant cited reference WO 94/18379.\*
(Continued)

*Primary Examiner* — Donald J Loney
(74) *Attorney, Agent, or Firm* — Young & Thompson

(57) ABSTRACT

Method for designing a corrugated roofing sheet made of natural fibers, impregnated with bitumen including a uniform pattern of mutually parallel alternating corrugations borne by a mid-plane, the corrugations defining rounded crests each separated from the next by a rounded trough, the crests and trough being connected by alternately inclined portions, the transverse offset between two successive crests being equal to the transverse offset between two successive troughs and defining the pitch P of the corrugations, the sheet having a thickness E of material substantially constant over its extent, and a height H being twice the distance between the mid-plane and the exterior surface of a crest or twice the distance between the mid-plane and the exterior surface of a trough, these two distances being identical. The height, thickness and pitch values are determined by $Fi < H^3/(8 \times E \times (H+P)) < Fs$, where $Fi = 25$ mm and $Fs = 35$ mm.

7 Claims, 2 Drawing Sheets

(51) Int. Cl.
*D06M 15/17* (2006.01)
*E04D 3/32* (2006.01)
*B32B 3/28* (2006.01)
*B32B 11/00* (2006.01)
*B32B 11/02* (2006.01)
*B32B 11/10* (2006.01)
*D06M 101/02* (2006.01)

(52) U.S. Cl.
CPC .............. *B32B 11/00* (2013.01); *B32B 11/02* (2013.01); *B32B 11/10* (2013.01); *D06M 2101/02* (2013.01); *E04D 3/32* (2013.01); *Y10T 428/24694* (2015.01); *Y10T 428/31815* (2015.04)

(56) References Cited

OTHER PUBLICATIONS

"Aqualine—Technical Datasheet and Fixing Guide for Roof and Wall Covering", Sep. 1, 2009 (Sep. 1, 2009), pp. 1-3, XP055176519, Retrieved from the Internet <URL:http://www.ikogroup.co.uk/SiteFiles/Content/MediaLibrary/Documents/Data Sheets/Aqualine-Installation-Guidelines-_09-09_.pdf> [retrieved on 20150313].
International Search Report, dated Sep. 1, 2015, from corresponding PCT Application, PCT/RF2015/051667.

\* cited by examiner

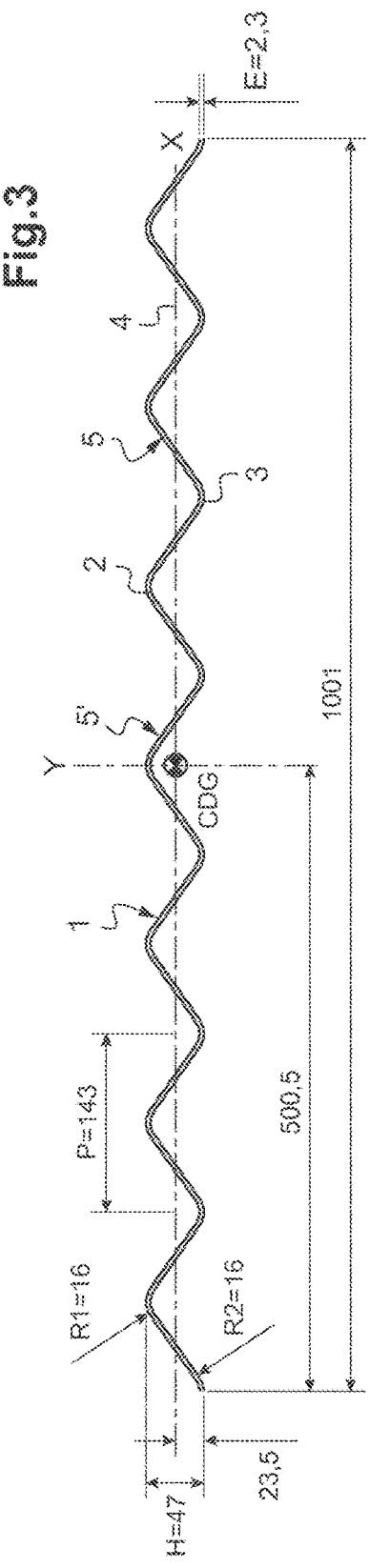
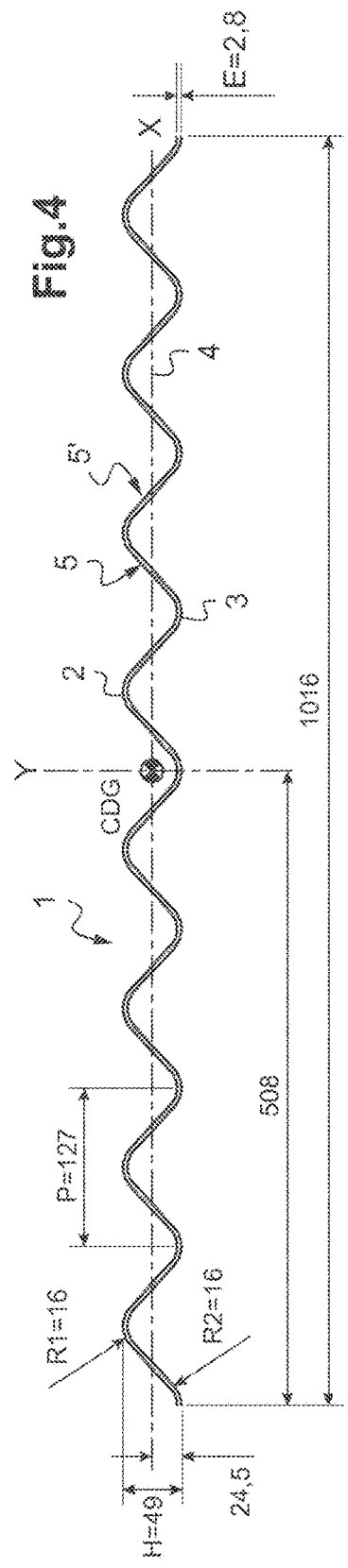

METHOD OF DESIGNING A CORRUGATED SHEET AND CORREGATED SHEET OBTAINED

The present invention relates to a method of designing a corrugated sheet as well as a corrugated sheet. More particularly, it applies to roof covering elements that are corrugated sheets made of natural fibres, in particular cellulose, and impregnated with bitumen.

BACKGROUND OF THE INVENTION

The hot-bitumen-impregnated cellulose corrugated sheets are known and their dimensions are standardized, whether it is de facto or by normalization.

Given the cost of the material used for making these sheets, in particular the cellulose fibre and the bitumen, it is desirable to reduce the required quantity of material while having interesting mechanical characteristics, in particular as regards the sheet inertia. The quantity of material is directly linked to the volume of material.

Now, the applicant has noticed that the inertia depends, in decreasing order of importance, on the corrugation height, the corrugation pitch, the corrugation radius and the thickness of material, and that the potential other parameters can be neglected. The volume of material depends itself, in decreasing order of importance, on the thickness of material, the corrugation pitch, the corrugation height and the corrugation radius, and the potential other parameters can be neglected.

Due to the fact that the same parameters intervene in these two characteristics of inertia and volume of material, the applicant has produced a formula making it possible to determine values of corrugation height, corrugation pitch and thickness of material that allow obtaining particularly interesting characteristics in terms of inertia-to-volume ratio for a corrugated sheet. The corrugation radius having a low impact on the volume of material, it is not taken into account in the formula.

The produced formula is an inequality. Moreover, in order to generalize the application of the formula, the applicant has more particularly taken into account the inertia per width unit as well as the volume per width unit. By way of information and as shown in FIG. 1, the length L of a corrugated sheet extends parallel to the crests (or troughs) of the corrugations and the width I extends perpendicularly to the corrugations. The width is hence transverse with respect to the corrugations.

A corrugated sheet is known from the document "Onduline Easyline", of the 1st of Jun. 2003, page 1-1, XP055176511, but the dimensional characteristics thereof do not respect the formula proposed. Documents about "AQUALINE" corrugated sheets, respectively XP055176518 and XP055176519, or the patent application WO94/18379, are also known. None of these documents discloses such a formula or exposes such a problem of optimization. Furthermore, the inertia depends on many parameters, both of the dimensional and the composition type, and it is not taught in these documents to select more specifically certain of the parameters for the indicated purpose and for obtaining the formula, or even to modify, still for that purpose, more particularly certain of the parameters of a known sheet rather that the other ones, and to obtain a corrugated sheet having dimensions satisfying the formula.

SUMMARY OF THE INVENTION

Hence, the invention relates to a method of designing a corrugated roofing sheet, said bitumen-impregnated natural-fiber sheet having a uniform pattern of mutually parallel alternating corrugations borne by a mid-plane, said alternating corrugations defining, in the vertical and cross section of the sheet, rounded crests each separated from the next one by a rounded trough, the crests and troughs being connected by alternately inclined portions, the crests being above the mid-plane and the troughs below the mid-plane, the inclined portions cutting the mid-plane at the middle thereof by having a part above the mid-plane and a part below the mid-plane, the transverse spacing between two successive crests being equal to the transverse spacing between two successive troughs and defining the pitch P of the corrugations, the sheet having a thickness E of material substantially constant over its extent, the sheet having a height H defined as being twice the distance between the mid-plane and the external surface of a crest or twice the distance between the mid-plane and the external surface of a trough, these two distances being identical.

According to the invention, the height H, thickness E and pitch P values are determined by solving an inequation:

$$Fi < H^3/(8 \times E \times (H+P)) < Fs$$

where Fi=25 mm and Fs=35 mm.

In various embodiments of the invention, the following means, which can be used alone or in any technically possible combination, are used:

the natural fibres are cellulose fibres,
the corrugation have a radius R1 corresponding to the radius of the upper corrugation, the crest, and have a radius R2 corresponding to the radius of the lower corrugation, the trough,
the limits used for the inequation are: Fi=29 mm and Fs=31 mm,
a parameter of inertia per sheet width unit is further calculated, said calculation of the parameter of inertia per sheet width unit being a function of the height H, the thickness E, the pitch P and the radii R1 and R2 of the crests and troughs of the corrugations, and the height H, thickness E and pitch P values are determined by solving the inequation for a determined value of the parameter of inertia per width unit, said determined value being either a constant of inertia per width unit defined a priori, or at least one value higher than a threshold of inertia per width unit determined a priori,
a parameter of volume per sheet width unit is further calculated, said calculation of the parameter of volume per sheet width unit being a function of the height H, the thickness E, the pitch P and the radii R1 and R2 of the crests and troughs of the corrugations, and the height H, thickness E and pitch P values are determined by solving the inequation for a determined value of the parameter of volume per width unit, said determined value being either a constant of volume per width unit defined a priori, or at least one value lower than a threshold of volume per width unit determined a priori,
the method is applied to a non-optimized corrugated sheet having thickness, height and pitch measurements determined in order to optimize at least one parameter of the sheet among the inertia per width unit and the volume per width unit by modifying one or several of said thickness, height and pitch measurements, and the method consists, for said measurements and according to the parameter(s) to be optimized, in:
calculating the inertia per width unit and/or the volume per width unit of the non-optimized corrugated sheet, then
using the result(s) of the inertia per width unit and/or of the volume per width unit of the non-optimized corrugated sheet as a constant defined a priori or as a threshold determined a priori as a determined value of the parameter(s), then determining the height H, thickness E and pitch P values by solving the inequation for the determined value(s) of the parameter(s) of inertia per width unit and/or of volume per width unit, the rounds of the crests and troughs are arcs of a circle with identical radius values, and the same radius value R1 and R2 is kept between the non-optimized corrugated sheet and the optimized corrugated sheet.

The invention also relates to a corrugated roofing sheet, said bitumen-impregnated natural-fiber sheet having a uniform pattern of mutually parallel alternating corrugations borne by a mid-plane, said alternating corrugations defining, in the vertical section of the sheet, rounded crests each separated from the next one by a rounded trough, the crests and troughs being connected by alternately inclined portions, the crests being above the mid-plane and the troughs below the mid-plane, the inclined portions cutting the mid-plane at the middle thereof by having a part above the mid-plane and a part below the mid-plane, the transverse spacing between two successive crests being equal to the transverse spacing between two successive troughs and defining the pitch P of the corrugations, the sheet having a thickness E of material substantially constant over its extent, the sheet having a height H defined as being twice the distance between the mid-plane and the external surface of a crest or twice the distance between the mid-plane and the external surface of a trough, these two distances being identical.

The dimensions of the sheet are such that the height H, thickness E and pitch P thereof have values that satisfy the inequation:

$$Fi < H^3/(8 \times E \times (H+P)) < Fs$$

where Fi=25 mm and Fs=35 mm.

In a variant, the limits of the inequation are: Fi=29 mm and Fs=31 mm.

The sheet is chosen so as to have for height H, thickness E and pitch P values, the values of one of the lines of values of the following table:

| H | E | P |
|---|---|---|
| 46 mm | 2.3 mm | 127 mm |
| 52 mm | 3 mm | 143 mm |
| 47 mm | 2.3 mm | 143 mm |
| 49 mm | 2.8 mm | 127 mm |

In particular cases, the inclined portions are substantially straight.

BRIEF DESCRIPTION OF THE DRAWINGS

The present invention will now be exemplified, without being limited thereby, by the following description in relation with the following figures.

DETAILED DESCRIPTION OF THE PREFERRED EMBODIMENTS

Generally, the formula obtained allows determining ex nihilo the dimensions of a corrugated sheet that shows an interesting inertia/volume (or, which is equivalent, inertia/weight) compromise or optimizing the dimensions of an already-known sheet by modifying a least one of the parameters among the height, the corrugation pitch and/or the sheet thickness in relation with the inertia and the volume (or the weight, which is equivalent). It is hence also applicable to existing industrial facilities that allow some adjustments, for example of the corrugation pitch or of the thickness of material, without thereby having to construct a new facility.

The application of the formula may also be made as a function of imposed constraints relating to the value of the desired inertia, in particular equal to a constant or higher than a threshold, and/or relating to the value of the desired volume of material, in particular equal to a constant or lower than a threshold, wherein the values can correspond to values chosen a priori, ex nihilo, or depend on values obtained on other sheets to be optimized. Furthermore, the constraints may also relate to one or two of the three height, pitch and thickness parameters for which is/are attributed one/two value(s) a priori or equal to that/those of a sheet to be optimized. The application of constraints being however limited by the fact that it must be possible to obtain a result satisfying the inequation, as the increase of the number of constrained parameters may lead to an impossibility to produce a height, pitch and thickness result satisfying the inequation. It is also possible to obtain several results of height, pitch and thickness values satisfying the inequation and it is the most advantageous one according to determined criteria, for example simplicity of implementation, that will be chosen.

Figure 1:
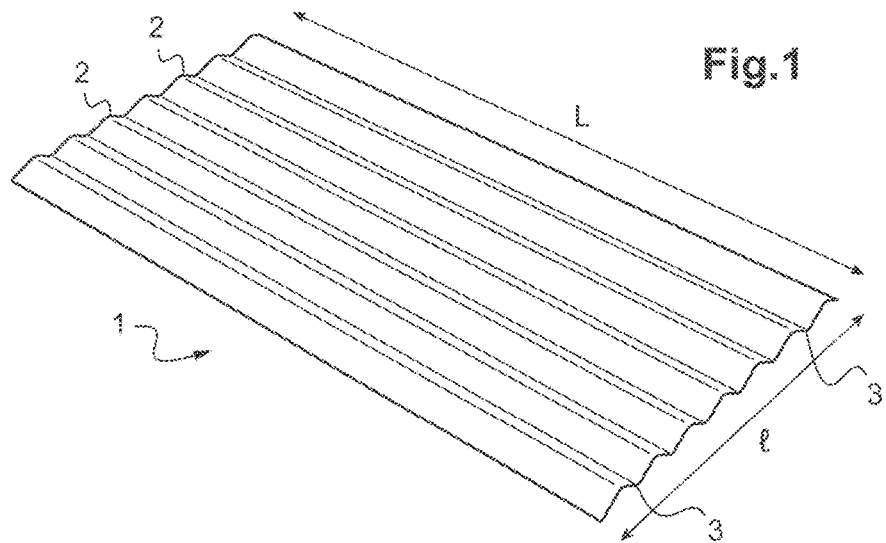
FIG. 1, which is a perspective view of a bitumen-impregnated cellulose corrugated sheet, FIG. 2, which is a cross-sectional view (or end view) of a part of a bitumen-impregnated cellulose corrugated sheet, FIG. 3, which is a cross-sectional view (or end view) of a first example of corrugated sheet optimization, and FIG. 4, which is a cross-sectional view (or end view) of a second example of corrugated sheet optimization.
Figure 2:
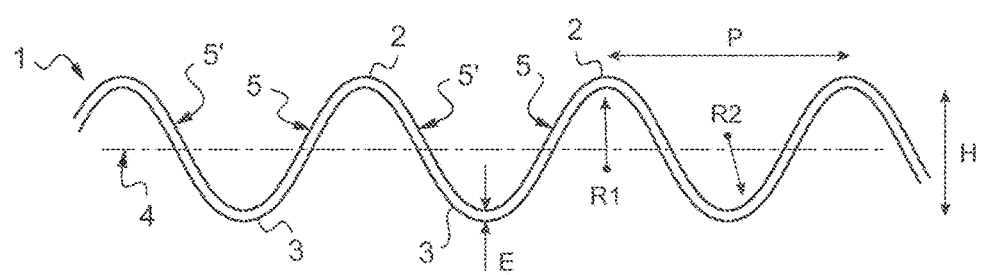

The bitumen-impregnated cellule corrugated sheets that are schematized in FIGS. 2 to 3 are seen in cross-section or, which is equivalent, from the edge or from the longitudinal end if considering that the length is parallel to the crests or to the troughs, and hence to the corrugations, of the sheet.

In FIG. 2, a part of corrugated sheet 1 is shown in relation with the dimensional parameters that are more particularly concerned. The sheet 1 includes a uniform pattern of mutually parallel alternating corrugations borne by a mid-plane 4 that cuts virtually the sheet into two parts, an upper one and a bottom one. The alternating corrugations define, in vertical and cross section of the sheet, rounded crests 2, each separated from the next one by a rounded trough 3. The crests and the troughs are connected by alternatively inclined portions 5, 5'. The crests 2 are above the mid-plane 4 and the troughs 3 are under the mid-plane 4. The inclined portions 5, 5' cut the mid-plane 4 at the middle thereof by having a part above the mid-plane 4 and a part below the mid-plane 4. The corrugations of these two parts are mirror-symmetrical with respect to the mid-plane 4 if considering a virtual offset of half a pitch between the two parts. In other alternative embodiments, it is not the case, in particular in the case where the radii R1 and R2 are different from each other.

Transversally, the spacing between two successive crests 2 is equal to the spacing between two successive troughs 3 and this spacing defines the pitch P of the corrugations. The sheet has a thickness E of material substantially constant over its extent. The sheet has a height H defined as being twice the distance between the mid-plane 4 and the external surface of a crest 2 or twice the distance between the mid-plane 4 and the external surface of a trough 3, these two distances being identical. In other words, the height H of the sheet 1 is its overall height.

The crests and the troughs are rounded as arcs of a circle and have preferably the same value of radius R1 (for the crest 2) and R2 (for the trough 3) to ensure the top—bottom symmetry of half a pitch P of the alternating corrugations. Preferably, the inclined portions 5, 5' include a linear part at least at the level of the mid-plane 4 and that is more or less extended upward and downward as a function of the height H of the sheet. Hence, it may exist, in the case of an inclined portion with a linear part, a transitional part of the inclined portion 5, 5' that is neither linear nor in an arc of a circle in the area that meets the crest, or the trough respectively (the transition is made between a straight area and an arc-of-a-circle area). In other cases, it is the whole inclined portion 5, 5' that is neither linear nor in an arc of a circle and that forms a transitional part (the transition is made between two arc-of-a-circle areas).

These dimensional parameters being now clarified, the application of the inequality making it possible to determine the dimensions of a sheet having an interesting inertia-to-volume (or inertia-to-weight, which is equivalent) characteristic can be explained. This inequality is the following one:

$$Fi < H^3/(8 \times E \times (H+P)) < Fs$$

where Fi=25 mm and Fs=35 mm.

In its simplest application, height H, pitch P and thickness E values are chosen a priori, and it is verified by calculation whether they verify the inequality. However, this method may be tedious.

In more advanced applications, a software is implemented, which allows scanning height H, pitch P and thickness E values, and the software calculates for each value of the scanning whether their verify the inequality. The scanning of the values may be continuous or, preferably, step-based, with for example a step of 0.5 mm or 1 mm between each value. Preferably, min and max limits are set for the scanning of the values, for example a scanning of the thickness between 1.5 mm and 5 mm with a scanning step of 0.2 mm. It is possible, in some cases, to set/constrain one or two of the three H, P, E parameters, the two other ones or the other one been scanned. These scanning methods (with or without constraint(s) on the only H, P, E parameters) may give many combinations of H, P, E values that satisfy the inequality.

It is possible to limit even more the H, P, E results satisfying the inequality by imposing other constraints in addition to the direct ones on H, P, E indicated hereinabove. These other constraints are in particular the inertia and/or the volume or the weight. The inertia and the volume or weight also depend on the H, P, E, R1 and R2 parameters. Other constraints may also be considered as, for example, the width of the sheet and the number of corrugations over the width, the fact that the sheet is laterally ended by a trough or another part of the corrugation.

In the following, the inertia per width unit and the volume per width unit will be considered. In a simple mode, this/these other constraint(s) consist(s) in imposing a defined value of inertia and/or of volume or weight. In other modes, a range of values of inertia and/or volume or weight may be defined and the determination of the parameters is made, preferably, also by scanning of the range(s) of values. These values are defined a priori.

These two constraints may be used together with the inequality, or only one of the two constraints, and a system with three (in)equations, or two (in)equations respectively, is then obtained.

The application to the optimization of the dimensions of a sheet is deduced from the previous applications under constraint. Indeed, the constraint(s) is(are) this time not defined a priori but are directly in relation with the dimensions and/or characteristics of the sheet to be optimized. For example, the inertia of the sheet to be optimized is calculated or measured, and H, P, E results satisfying the inequality and producing an optimized sheet with the same inertia, or a better inertia, are determined. It is the same for the volume or the weight that is calculated or measured on the sheet to be optimized, and H, P, E results satisfying the inequality and producing an optimized sheet with the same volume or weight, or a lower volume or weight, are determined. It is possible to combine both of them, for example for searching for an optimized sheet with a better inertia for a similar or lower weight. It is also possible to search for an optimized sheet with a lower weight for a similar or better inertia. The term "similar" is to be understood herein within the meaning of identical or close. It is understood that any searches are possible as, in particular, a better inertia for a lower weight. This optimization may impose constraints on H, P, E that come from the H, P, E values of the sheet to be so optimized: for example, it may be imposed as a constraint to keep the same thickness E of matter. Conversely, the constraint that the same pitch P and possibly the same H, may be imposed as this/these latter constraints can be required for reasons of compatibility between roof covering elements.

In any cases, in particular optimization or not, constraint or not, at least the indicated inequality must be applied to determine the H, P, E values of the sheet that is desired to be obtained. The obtained sheets have a particularly interesting inertia-to-volume (or weight) characteristic: they have an interesting mechanical strength for a relatively reduced quantity of material, hence a saving of material.

As seen, simple or complex solving tools may be used to determine the H, P, E dimensions of sheets satisfying the inequality of the invention. For example, with a raw method by scanning of values, in continuous or by discrete values, for the height and/or the pitch and/or the thickness and/or the inertia and/or the volume in order to search for height, pitch and thickness values satisfying the inequality. A more advanced method may include a step of creating a function based on the inequation and taking into account the possible constraints on the height and/or the pitch and/or the thickness and/or the inertia and/or the volume, then studying the function. Preferably, computer-based calculation and decision tools are implemented for that purpose.

FIGS. 3 and 4 relate to an optimization of a known bitumen-impregnated cellulose corrugated sheet (not shown) having the following dimensions: width 950 mm, thickness E 3 mm, height H 38 mm, pitch P 95 mm and radii R1 and R2 of the rounds of the crests and troughs 16 mm. This non-optimized sheet has ten crests. The inertia per width unit of this known sheet is of 54.4 cm$^4$/m. The volume per width unit of this known sheet is of 0.007719 m$^3$/m. If the inequality formula is applied to this known sheet, it is obtained 17.19 mm, which is outside the limits Fi=25 mm and Fs=35 mm of the inequality. In FIGS. 3 and 4, CDG denotes the centre of gravity of the sheet.

In FIG. 3, the constraint has been imposed to have the same inertia per width unit as the known sheet for a lower weight per width unit, hence for a lower volume per width unit. One of the results of the application of the inequality with this constraint gives a sheet whose dimensions are the following ones: pitch P=143 mm, height H=47 mm, thickness E=2.3 mm. For the optimized sheet obtained, it has been desired to have a width close to that of the non-optimized sheet and that ends at the bottom of a trough at its two ends (or at the top point of a crest if the sheet is turned upside down). It results therefrom that the optimized sheet obtained, as shown in FIG. 2, has seven crests and a width of 1001 mm, the radii of the arc-of-a-circle rounds of the crests and troughs being kept at R1=R2=16 mm. If the inequality formula is applied to these H, P, E values, it is obtained 29.70 mm.

In FIG. 4, the constraint has been imposed to have an increased inertia per width unit with respect to that of the known sheet for a same weight per width unit, hence for a same volume per width unit. One of the results of the application of the inequality with this constraint gives a sheet whose dimensions are the following ones: pitch P=127 mm, height H=49 mm, thickness E=2.8 mm. For the optimized sheet obtained, it has been desired to have a width close to that of the non-optimized sheet and that ends at the bottom of a trough at its two ends (or at the top point of a crest if the sheet is turned upside down). It results therefrom that the optimized sheet obtained, as shown in FIG. 4, has eight crests and a width of 1016 mm, the radii of the arc-of-a-circle rounds of the crests and troughs being kept at R1=R2=16 mm. If the inequality formula is applied to these H, P, E values, it is obtained 29.84 mm.

It is also possible to optimize the known sheet according to the following modes. If it is searched for an optimized sheet with a decrease of the volume per width unit and a better inertia per width unit, the application of the inequality formula may give an optimized sheet with P=143 mm, H=48 mm, E=2.4 mm. This optimized sheet has an inertia per width unit of 61.7 cm$^4$/m and a volume per width unit of 0.00578 m$^3$/m. If the inequality formula is applied to this optimized sheet, it is obtained 30.16 mm, which is well inside the limits Fi=25 mm and Fs=35 mm of the inequality, the H, P, E values hence effectively satisfying the inequality. It is to be noted that the radii of the arc-of-a-circle rounds of the crests and troughs has been kept at R1=R2=16 mm.

If it is still searched for an optimized sheet with a decrease of the volume per width unit and a better inertia per width unit, the application of the inequality formula may give an optimized sheet with P=127 mm, H=47 mm, E=2.5 mm. This optimized sheet has an inertia per width unit of 65.5 cm$^4$/m and a volume per width unit of 0.00633 m$^3$/m, lower than that of the non-optimized sheet. If the inequality formula is applied to this optimized sheet, it is obtained 29.83 mm, which is well inside the limits Fi=25 mm and Fs=35 mm of the inequality, the H, P, E values hence effectively satisfying the inequality. It is to be noted that the radii of the arc-of-a-circle rounds of the crests and troughs has been kept at R1=R2=16 mm.

It is understood that the application of the inequality may provide several sets of H, P, E values that satisfy the inequality. It is hence possible, in order to limit the number of possible results, to choose to increase the constraints when applying the inequality, by constraining the inertia and/or the weight or even other dimensional characteristics and for example H, P, E and/or I (the width of the corrugated sheet). In applications more advanced than the simple scanning of the H, P, E values to search, possibly under constraint(s), for results satisfying the inequality, it is possible to study potential curves of progression of the inequality formula $H^3/(8 \times E \times (H+P))$ and those of the inertia per width unit and of the volume per width unit, and to determine by a linear combination a formula or curve of which a singular point will be searched for as a function of H, P, E, in particular a maximum or a minimum according to the choice that has been made for the linear combination. In any cases, the inequality will have to be respected.

The invention claimed is:

1. A method of designing a bitumen-impregnated natural-fiber corrugated roofing (1) sheet, where said sheet has a uniform pattern of mutually parallel alternating corrugations borne by a mid-plane (4), and said alternating corrugations are defined, in the vertical and cross section of the sheet, as rounded crests (2) each separated from the next one by a rounded trough (3), the crests and troughs being connected by alternately inclined portions (5, 5'), the crests (2) being above the mid-plane (4) and the troughs (3) below the mid-plane (4), the inclined portions (5, 5') cutting the mid-plane (4) at the middle thereof by having a part above the mid-plane and a part below the mid-plane, the transverse spacing between two successive crests (2) being equal to the transverse spacing between two successive troughs (3) and defining the pitch P of the corrugations, the sheet (1) having a thickness E of material substantially constant over its extent, the sheet having a height H defined as being twice a first distance between the mid-pane (4) and the external surface of a crest (2) or twice a second distance between the mid-plane (4) and the external surface of a trough (3), said first and second distances being identical, said method comprising the steps of:

determining the height H, thickness E and pitch P values by solving an inequation:

$$Fi < H^3/(8 \times E \times (H+P)) < Fs$$

where Fi=25 mm and Fs=35 mm, Fi and Fs being limits of the inequation; and calculating at least one parameter selected from inertia per sheet width unit and volume per sheet width unit, said calculation of the parameter of inertia per sheet width unit being a function of the height H, the thickness E, the pitch P and the radii R1 and R2 of the crests and troughs of the corrugations, said calculation of the parameter of volume per sheet width unit being a function of the height H, the thickness E, the pitch P and the radii R1 and R2 of the crests and troughs of the corrugations, and the height H, thickness E and pitch P values being determined by solving the inequation for a determined value of the parameter of inertia per sheet width unit and/or a determined value of the parameter of volume per sheet width unit, said determined value being either a constant of respectively inertia per width unit or volume per sheet width unit defined a priori, or at least one value respectively higher than a threshold of inertia per width unit or lower than a threshold of volume per sheet width unit determined a priori.

2. The method according to claim 1, wherein, in said determining step, the limits used for the inequation are:

Fi=29 mm, and

Fs=31 mm.

3. The method according to claim 1, wherein the method is applied to a non-optimized corrugated sheet having thickness, height and pitch measurements determined in order to optimize at least one parameter selected from the inertia per width unit and the volume per sheet width unit by modifying one or several of said thickness, height and pitch measurements, and wherein the method further comprises, for said measurements and according to the parameter(s) to be optimized:

calculating the inertia per width unit and/or the volume per sheet width unit of the non-optimized corrugated sheet; then using the result(s) of the inertia per width unit and/or volume per sheet width unit of the non-optimized corrugated sheet as the constant defined a priori or as the threshold determined a priori for the determined value(s) of the parameter(s); then determining the height H, thickness E and pitch P values by solving the inequation for the determined value(s) of the parameter(s), respectively inertia per sheet width unit and/or volume per sheet width unit.

4. The method according to claim 3, wherein the rounds of the crests (2) and troughs (3) are arcs of a circle with identical radius values, and wherein the same radius value is kept between the non-optimized corrugated sheet and the optimized corrugated sheet.

5. The method according to claim 1, wherein the inclined portions are substantially straight.

6. The method according to claim 1, wherein the volume per sheet width unit parameter is replaced by a weight per sheet width unit parameter in the method.

7. The method according to claim 3, wherein the volume per sheet width unit parameter is replaced by a weight per sheet width unit parameter in the method.

* * * * *